United States Patent [19]
Walsh et al.

[11] Patent Number: 5,873,660
[45] Date of Patent: Feb. 23, 1999

[54] MORPHOLOGICAL SEARCH AND REPLACE

[75] Inventors: James E. Walsh, Redmond; Ronald A. Fein, Seattle, both of Wash.

[73] Assignee: Microsoft Corporation, Redmond, Wash.

[21] Appl. No.: 491,750

[22] Filed: Jun. 19, 1995

[51] Int. Cl.[6] .................................................. B41J 5/30
[52] U.S. Cl. .......................... 400/63; 400/74; 364/419.14
[58] Field of Search .................. 400/63, 74; 364/419.13, 364/419.14; 395/794, 795

[56] References Cited

U.S. PATENT DOCUMENTS

| | | | |
|---|---|---|---|
| 4,907,173 | 3/1990 | Yamada et al. | 400/63 |
| 5,146,405 | 9/1992 | Church | 364/419 |
| 5,297,039 | 3/1994 | Kanaegami et al. | 364/419.13 |
| 5,305,205 | 4/1994 | Weber et al. | 364/419.14 |
| 5,369,577 | 11/1994 | Kadashevich et al. | 364/419.13 |
| 5,475,587 | 12/1995 | Anick et al. | 364/419.13 |
| 5,487,000 | 1/1996 | Takahashi et al. | 364/419.14 |

OTHER PUBLICATIONS

*WordPerfect 6.1 User's Guide,* Utah, 1994, pp. 160–164.

*Primary Examiner*—John Hilten
*Attorney, Agent, or Firm*—Klarquist Sparkman Campbell Leigh & Whinston LLP

[57] ABSTRACT

A morphological find and replace editing tool for a word processor replaces inflected forms of a user-specified find word in a text document with inflected forms of a user-specified replacement word having matching parts of speech. The tool retrieves sets of word forms having a same root word as the find and replacement words, respectively, from a word forms database. The tool selects a single set of word forms with a common root word for each of the find and replacement words such that the find and replacement words are matching parts of speech. Where word forms in the find word's set are found in the text document, they are replaced with a word form from the replacement word's set with a best matching part of speech.

30 Claims, 4 Drawing Sheets

MORPHOLOGICAL SEARCH AND REPLACE

FIELD OF THE INVENTION

This invention relates generally to textual document editing tools, and more particularly relates to find and replace tools in a word processor.

BACKGROUND OF THE INVENTION

When editing a text document, it is sometimes useful to replace a particular character pattern (e.g., one or more characters, a word, or group of words) with another. In some cases, a word may be consistently misspelled throughout a document and needs to be replaced with its correct spelling. In other cases, an original word choice used consistently throughout a document may be stylistically poor and can be improved by replacement with a better choice. In still others, common punctuation or formatting errors (e.g., a single space after a period) may require replacement with the correct character pattern (e.g., period, double space). Making these kinds of global changes to a document manually can prove to be tedious, time consuming, and subject to human error.

Some prior word processors provide a find and replace editing tool to automate the task of replacing one character pattern with another. In general, these tools allow a user to specify a particular combination of characters (a "find pattern") to be searched for in a text document, and a particular combination of characters (a "replacement pattern") which is to replace the find pattern. Some prior find and replace editing tools allow the user optionally to include search qualifiers, such as wildcard characters, to specify limited variations of the find and/or replacement patterns. Typically, the user also can specify whether to replace occurrences of the find pattern one at a time (to confirm each replacement), or all at once. Employing a string search algorithm, the find and replace tool searches the text of the document for any occurrence of the find pattern in a forward or backward direction starting from a particular location (e.g., current insertion point), or within a selected text block. When an occurrence of the find pattern is located, the tool replaces the occurrence with the replacement pattern.

Most words have various inflected forms to indicate certain grammatical relationships, such as number, case, gender, tense, etc. This can create a problem when replacing one word choice with another. In typical prior find and replace editing tools, only a fixed find pattern and fixed replacement pattern can be specified. Accordingly, with these prior find and replace editing tools, each inflected form of the words must be separately replaced. Since the user is responsible for separately initiating replacement of each inflected form, the task of replacing one word choice for another therefore is slow and subject to human error.

Some prior find and replace editing tools provide pattern matching features which allow some limited variations of the find and replacement patterns to be specified using search qualifiers. A user potentially can construct find and replacement patterns to replace inflected forms of one word choice with another in a single find and replace editing operation, by using search qualifiers to specify variations of the patterns for each of the word choices' inflected forms. However, the search qualifiers generally are difficult for the average user to learn and use. Since the variations of the find and replacement patterns would have to be specified in exacting detail, constructing such find and replacement patterns would require exact knowledge of the word choices' inflected forms, and would be difficult, error prone, and time consuming for even sophisticated users.

One prior word processor, Novell's WordPerfect version 6.1 for Windows word processor ("WordPerfect 6.1"), has a find and replace editing tool which provides a "word forms" option. When this option is selected, the find and replace editing tool replaces inflected forms of a find word with corresponding inflected forms of a replacement word (i.e., the find word is "morphologically" replaced with the replacement word). To specify the find and replacement words, the user can enter any inflected form of these words. For example, when "run" is specified as the find word and "walk" as the replacement word, an occurrence of an inflected form of run (i.e., run, runs, ran, and running) in the text document is replaced with the corresponding inflected form of walk (i.e., walk, walks, walked, and walking, respectively). The user optionally can choose to replace all occurrences of the inflected forms of the find word. The word forms option makes the task of replacing one word choice with another simpler and quicker, since the user need not account for nor separately initiate replacement of each inflected form of the words.

The word forms option of the WordPerfect 6.1 find and replace editing tool has a number of drawbacks, one of which is that it fails to resolve a number of common ambiguous situations. One such ambiguous situation arises from the fact that there are many words which are inflected forms of more than one base or root word. For example, the word "saw" is an inflected form of two root words, i.e., a noun singular form of root word "saw" (meaning a tool for cutting wood) and a past tense verb of root word "to see" (meaning to perceive visually). When such a word (which is an inflected form of multiple base words) is specified as the find or replace word, it is unclear which base word is intended by the user. The WordPerfect 6.1 find and replace editing tool fails to resolve this ambiguity. When a specified find or replace word is an inflected form of multiple base words, the WordPerfect 6.1 find and replace editing tool (with word forms option selected) finds and replaces inflected forms of all the multiple base words.

Another ambiguous situation results from the fact that many base words have inflected forms which constitute more than one part of speech. For example, the word "sheep" is both a singular and plural noun. Other words have separate inflected forms for singular and plural nouns (e.g., "goat" and "goats"). Additionally, some words have multiple plural forms (e.g., "thesauri" and "thesauruses"). As a result, one inflected form of the find word may correspond to multiple inflected forms of the replacement word. Again, the WordPerfect 6.1 find and replace editing tool (with word forms option selected) fails to resolve the ambiguity. When an inflected form of the find word corresponds to multiple inflected forms of the replacement word, the user is presented with a list of the multiple corresponding inflected forms of the replacement word from which to select. The first word form in the list is presented to the user as a default selection, which the user can select by pressing the "return" key. Alternatively, the user can select another of the word forms with the "arrow" keys or mouse. This considerably slows the task of replacing word choices.

The failure of the find and replace editing tool in WordPerfect 6.1 to resolve many ambiguous situations can prove particularly destructive when the user chooses to replace all occurrences of the find word (rather than replacing one occurrence at a time so as to confirm replacement). Due to the unresolved ambiguities, choosing to replace all occurrences may have results that are neither intended nor expected by the user. For example, replacing all occurrences of "saw" with "hammer" (with intent to replace inflected forms of their noun base words) has the unintended consequence of also replacing verb forms of "to see" with verb forms of "to hammer" (e.g., "seen" with "hammered"). Further, when there are multiple matching inflected forms, WordPerfect 6.1's find and replace tool selects the default first word form in the corresponding inflected word forms list without user confirmation. These results can be very difficult for the user to foresee and correct.

An object of the invention is to prevent user errors by automating replacement of word choices.

Another object of the invention is to provide an editing tool that morphologically replaces a user-specified find word with a user-specified replacement word in an efficient manner.

Yet another object of the invention is to provide an editing tool for morphologically finding and replacing words so as to resolve ambiguities resulting from a user-specified find or replace word having multiple root words, and from an inflected form of one of the find or replace words corresponding to multiple inflected forms of another of the find or replace words.

A further object of the invention is to help prevent unintended or destructive consequences to the user's text document when morphologically finding and replacing words.

SUMMARY OF THE INVENTION

In accordance with a first aspect of the invention, a morphological find and replace editing tool and method is provided which resolves ambiguities arising when a user-specified find or replacement word is an inflected form of multiple root words. To resolve the ambiguity, the morphological find and replace tool selects a single root word for each of the find and replacement words. In a preferred embodiment of the invention, the morphological find and replace tool selects single root words such that the user-specified find and replacement words are inflected forms having identical parts of speech of the selected root words. This is based on the assumption that the user will enter the find and replacement words with the same morphological properties (e.g., in the same tense, for verbs). Therefore, an interpretation of the root words which yields different morphological properties for the specified find and replacement words is assumed to be incorrect. For example, when "saw" and "hammer" are specified as the find and replacement words, the noun root word of "saw" is selected since under that assumption, both "saw" and "hammer" are noun singular forms: "saw" is a noun singular form of the noun root word "saw" and "hammer" also is a noun singular form of its root word. The verb root word of "saw" is not selected because "saw" is the past tense form of its verb root word "to see" and "hammer" is the infinitive form of its root word.

By resolving the ambiguity of multiple root words in this manner, the editing tool and method is more likely to effect the word choice replacement intended by the user. The user can specify inflected forms with matching parts of speech of the root words intended to be replaced as the find and replacement words. By doing so, the user can avoid the unintended replacement of other root words of the find and replacement words. Unintended consequences thus are avoided.

By contrast, the WordPerfect 6.1 find and replace editing tool described above fails to resolve the ambiguity arising from multiple root words, and therefore finds and replaces inflected forms of all possible root words of the specified find and replacement words. Thus, in the example where "saw" and "hammer" are specified as the find and replacement words, an occurrence of the inflected form "seen" in a document being edited would be replaced with "hammered." Most likely, this result is not what the user intended.

In accordance with a further aspect of the invention, a morphological find and replace editing tool and method is provided which resolves ambiguities arising when multiple inflected forms of the replacement word correspond to an inflected form of the find word. To resolve the ambiguity, the corresponding inflected form of the replacement word that best matches the inflected form of the find word is selected for replacing the inflected form of the find word. In the preferred embodiment, the best matching inflected form is selected by scoring each of the multiple corresponding inflected forms according to a predetermined ranking of their parts of speech. If the selected inflected form is not correct, the user is allowed to type in any changes. Selection of the best matching inflected form (according to the predetermined ranking) makes word choice replacement more efficient since user input is minimized.

In accordance with yet another aspect of the invention, a recommendation against selecting morphological replacement of all occurrences of a find word's inflected forms is displayed when such action is selected. This reduces the possibility of unintended destructive consequences.

Additional features and advantages of the invention will be made apparent from the following detailed description of a preferred embodiment which proceeds with reference to the accompanying drawings.

DETAILED DESCRIPTION OF THE PREFERRED EMBODIMENTS

Figure 1:
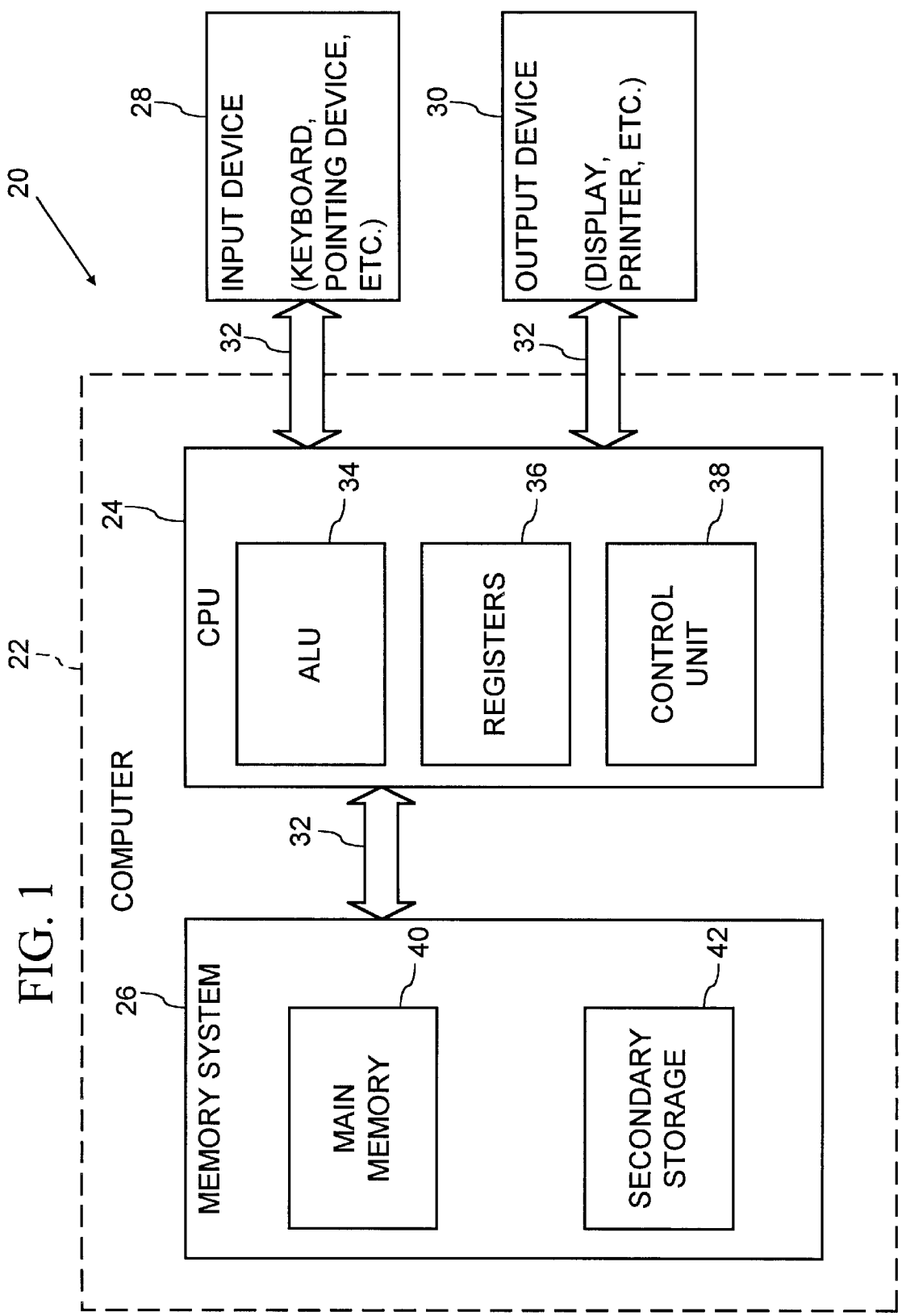
FIG. 1 is a block diagram of a computer system that may be used to implement a method and apparatus embodying the invention.

Referring to FIG. 1, an operating environment for the preferred embodiment of the present invention is a computer system 20 that comprises at least one high speed processing unit (CPU) 28, in conjunction with a memory system 30, an input device 24, and an output device 26. These elements are interconnected by a bus structure 32.

The illustrated CPU 28 is of familiar design and includes an arithmetic logic unit (ALU) 33 for performing computations, a collection of registers 34 for temporary storage of data and instructions, and a control unit 36 for controlling operation of the system 20. The preferred realization of CPU 28 is a Pentium or other x86 family processor manufactured by Intel or other compatible processor, but a variety of other suitable processors, including those from Digital Equipment, MIPS, Motorola, etc., can alternatively be used.

The memory system 30 includes main memory 38 and secondary storage 40. Illustrated main memory 38 takes the form of 16 megabytes of semiconductor RAM memory; various other amounts and structure of memory can alternatively be used. Secondary storage 40 takes the form of long term storage, such as ROM, optical or magnetic disks, flash memory, or tape. Those skilled in the art will recognize that memory 30 can comprise a variety of alternative components.

The input and output devices 24, 26 are also familiar. The input device 24 can comprise a keyboard, a mouse, a physical transducer (e.g., a microphone), etc. The output device 26 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, making use of computer resources made available through the operating system. Both are resident in the illustrated memory system 30.

In accordance with the practices of persons skilled in the art of computer programming, the present invention is described below with reference to symbolic representations of operations that are performed by computer system 20, unless indicated otherwise. Such operations are sometimes referred to as being computer-executed. It will be appreciated that the operations which are symbolically represented include the manipulation by CPU 22 of electrical signals representing data bits and the maintenance of data bits at memory locations in memory system 30, as well as other processing of signals. The memory locations where data bits are maintained are physical locations that have particular electrical, magnetic, or optical properties corresponding to the data bits.

Figure 2:
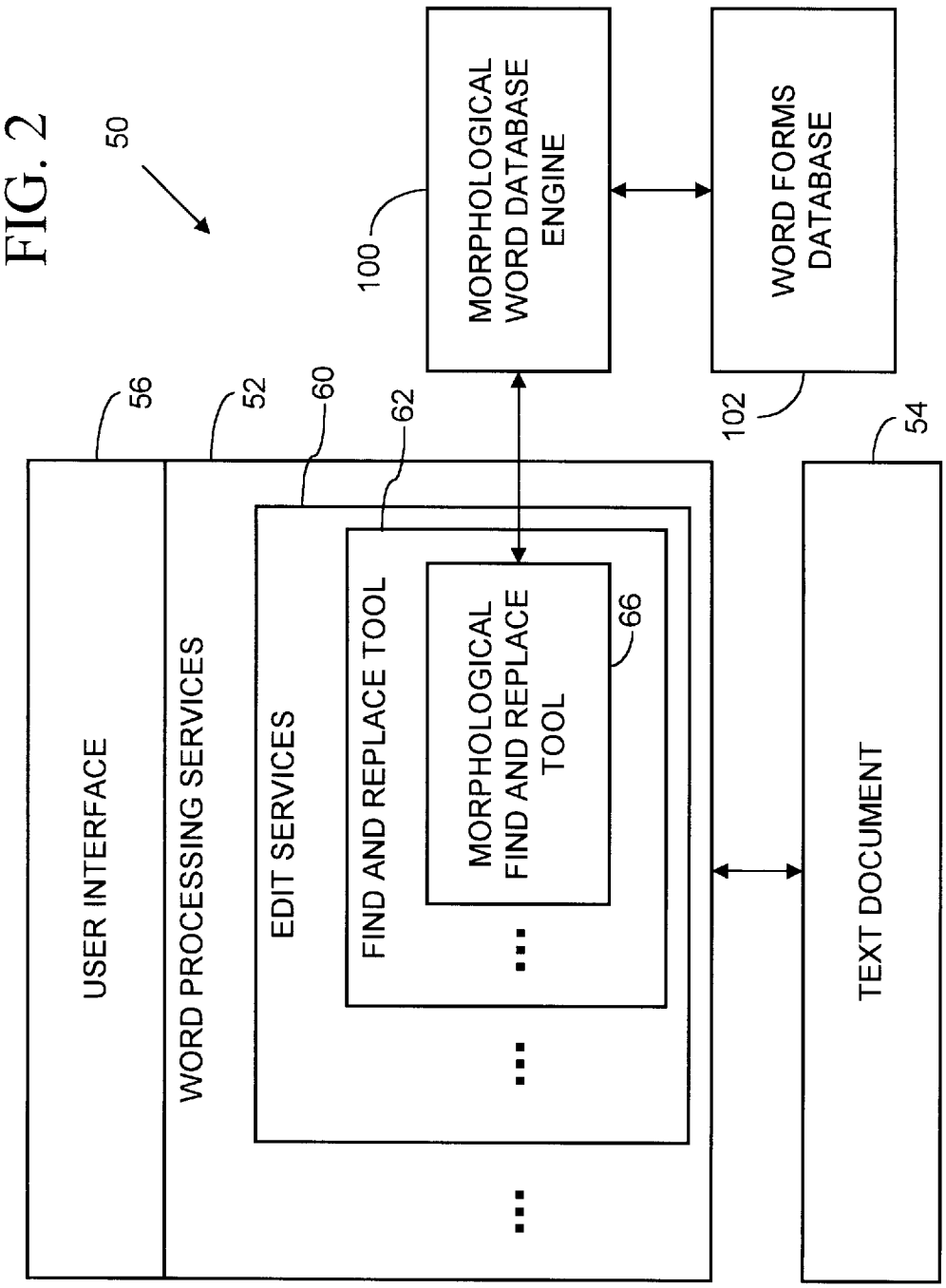
FIG. 2 is a block diagram of a word processor within a computer system such as shown in FIG. 1, and having a morphological find and replace editing tool according to the preferred embodiment of the invention.

Referring to FIG. 2, the preferred embodiment of the present invention is illustrated in the context of a word processor 50, such as Microsoft Corporation's Word. The word processor 50 comprises various word processing services 52 with which a user creates and modifies a text document 54. The text document can comprise both textual and non-textual components. The word processing services 52 are accessible to the user through a user interface 56, which provides controls such as a conventionally known tool bar or menu structure by which the services are activated. The word processing services 52 also are available through a macro language, or other automation facilities (e.g., dynamic data exchange or "DDE"), which permit the word processing services 52 to be controlled by a separate application program or from a macro with or without user interaction.

The word processing services 52 include services that implement many conventionally known word processing functions, including filing, printing, formatting, spell-checking, etc. The word processing services 52 also include editing services 60, some of which are conventionally known functions such as cut, paste, and copy functions. In addition, the editing services 60 include a find and replace editing tool (the "replace tool") 62 with a component morphological find and replace editing tool 66. The morphological find and replace editing tool (the "morphological replace tool") 66 operates to replace inflected forms of one word with those of another, and further implements features to resolve ambiguities according to the invention.

Figure 3:
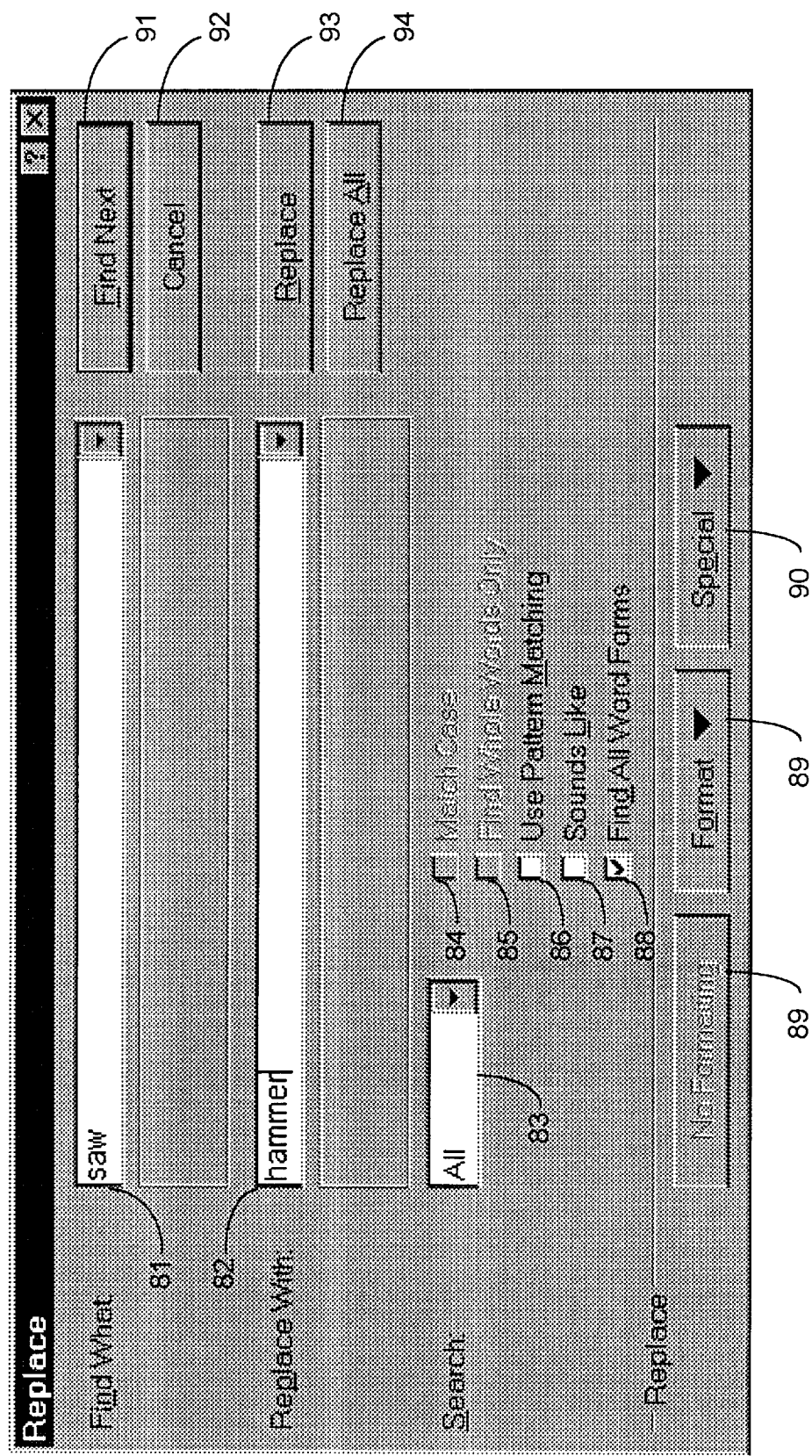
FIG. 3 is a view of a dialog box in a user interface of the word processor of FIG. 2, with controls for the morphological find and replace editing tool.

With reference to FIG. 3, the replace tool 62 (FIG. 2) and its component morphological replace tool 66 (FIG. 2) are controlled by the user from a replace dialog box 80 provided as a component of the word processor's user interface 56 (FIG. 2). The replace dialog box 80 is accessed or opened by the user through an "edit-replace" command in a menu structure of the user interface 56. The replace dialog box 80 also can be accessed by a hot-key combination (e.g., by pressing the "control" and "h" keys in combination on the keyboard input device 28 of FIG. 1). The replace dialog box 80 also can be accessed in the preferred embodiment by activating a "replace" button control in a "find" dialog box (not shown).

The replace dialog box 80 includes a plurality of user interface controls 81–94 that respond to user input via the input device 28 (FIG. 1) for controlling the replace tools 62, 66. The user utilizes the controls to specify what text is to be found and replaced by the tools 62, 66 and various options. The text or character pattern to be found (hereafter the "find word") is entered by the user in a "find what" text entry box 81. The text or character pattern which is to replace an occurrence of the find word (hereafter the "replacement word") is entered by the user in a "replace with" text entry box 82. Partial words, nonsense words, or character combinations that do not exist in the user's language can be specified by the user as the find and replacement words in the text entry boxes 81–82.

Optional features of the tools 62, 66 are specified with a "search" drop down list 83, check boxes 84–88, and buttons 89–90. The search drop down list 83 provides a list of three selections, "down," "up," and "all," with which the user selects the direction and scope of search. With the "no formatting," "format," and "special" buttons 89–90, the user limits the find and replace words to particular formats. With the check boxes 84–78, the user selects different types of find and replace functions, including "match case," "find whole words only," "use pattern matching," "sounds like," and "find all word forms." By selecting the "find all word forms" check box 88, the user selects the functionality of the morphological replace tool 66.

Finding and replacing functions are activated using the "find next," "replace," and "replace all" buttons 91, 93, and 94. The find next button 91 causes the selected tool 62, 66 to find a next occurrence of the find word that meets the user's specified criteria selected with the list 83, check boxes 84–78, and buttons 89–90. For example, when the find all word forms check box 88 is selected, the morphological replace tool 66 finds a next occurrence of any inflected form of the find word (which is contained within a single selected word wheel as described in more detail below). The replace button 93 causes the tool 62, 66 to replace the current instance (if any) of a find word meeting the user specified criteria, and then find the next instance of the find word also meeting the criteria. The replace all button 94 causes the tool 62, 66 to find and replace all occurrences of the find word that meet the selected criteria in the text document 54. When replacing, the tool 62, 66 retains the capitalization (i.e., no capitals, initial capital, or all capitals) of the found occurrence (i.e., the capitalization of the found occurrence is applied to the word form that replaces it), except when overridden by the user (such as by selecting the match case control 84).

The remaining button 92 is labeled "cancel." The cancel button 92 closes the dialog box 80 when actuated by the user.

Referring again to FIG. 2, the morphological replace tool 66 utilizes a morphological word database engine 100 and a word forms database 102 to identify the inflected forms of the specified find and replace words. The word forms database 102 contains most commonly-used words, including their various inflected forms (hereafter word forms), of a language in which the text document 54 is written. The preferred embodiment, for example, contains most commonly used word forms of the English language. The morphological replace tool 66 can be adapted for use with text documents written in other languages by providing a word forms database of commonly-used word forms of those languages. Closely related dialects (e.g., U.S. and British variants of English) can be stored as a single word forms database. The English word forms database used in the preferred embodiment of the invention includes both U.S. and British word forms. The same word form database with both British and U.S. dialects is then used both in versions of the word processor 50 intended for British-spelling (e.g., British, Canadian, South African, and Australian) users (hereafter "the British English version word processor") and versions of the word processor 50 intended for U.S. users (hereafter "the U.S. English version word processor").

The word forms database 102 further stores information relating to each word form's part of speech and root word. In the preferred embodiment, the word forms database 102 stores part of speech information in the form of part-of-speech identifiers. In the word forms database 102, one or more of the part-of-speech identifiers are associated with each of the word forms. These part-of-speech identifiers are numeric codes representing various parts of speech, embodying morphological properties such as tense, number, case, gender, etc. For example, unique codes are assigned to represent at least each of the following parts of speech: noun singular, noun plural, infinitive verb, gerund, past participle, third person singular verb, and past tense verb. If the word forms database contains word forms from more than one dialect of a language, the part-of-speech identifiers may also represent dialect for those word forms which differ between the dialects. For example, in the English word form database used in the preferred embodiment, part-of-speech identifiers are included to identify word forms that are British variants.

In the preferred embodiment, the information as to the root words of the word forms is represented in the word forms database 102 by organizing the word forms into lists of word forms that have the same root word. Each list generally contains its root word as one of the word forms. The root word in each list can be explicitly identified in some embodiments of the invention, such as by associating a single-bit flag per word form to indicate whether it is the root word. The root word of each list, however, need not be identified in all embodiments. Preferably, the word forms database is compressed (by removing redundant information and/or other known data compression techniques) to reduce storage requirements.

The morphological word database engine 100 implements functions to retrieve lists of word forms having the same root words as the find and replace words specified by the user in the text entry boxes 81–82. In the preferred embodiment, the engine 100 uses circularly linked lists (herein referred to as "word wheels") to represent the lists of word forms having a same root word. More specifically, when the user specifies the find and replacement words and activates the morphological replace tool 66 using the check box 88 and one of the buttons 91, 93 or 94, the morphological replace tool 66 sends requests to the engine 100 to retrieve word wheels containing the find and replacement words. In response, the engine 100 locates any word wheels containing the requested word and begins returning word forms from that word wheel. The engine 100 begins returning word forms from some point in the word wheel (not necessarily the first word form of the word wheel) and continues returning successive word forms from around the word wheel until arriving again at the beginning point.

Most words are contained in one word wheel only. Some words, however, are encountered in multiple word wheels. The following tables 1–7 show the word wheels returned by the morphological word database engine 100 for the words "hammer" (table 1), "see" (table 2), "saw" (tables 3–4), "buy" (table 5), "purchase" (table 6), and "observe" (table 7).

TABLE 1

Word Wheel for "hammer"

| Word Form | Part of Speech |
| --- | --- |
| hammer | Ns |
| hammer | inf |
| hammered | ed en |
| hammering | ing |
| hammers | 3ps |
| hammers | Ns |

TABLE 2

Word Wheel for "see"

| Word Form | Part of Speech |
| --- | --- |
| see | Ns |
| see | inf |
| seeing | ing |
| seen | en |
| sees | 3ps |
| sees | Np |
| saw | ed |

TABLE 3

Word Wheel for "saw" (noun form)

| Word Form | Part of Speech |
| --- | --- |
| saw | Ns |
| saw | inf |
| sawed | ed en |
| sawing | ing |
| saws | 3ps |
| saws | Np |

TABLE 4

Word Wheel for "saw" (verb form)

| Word Form | Part of Speech |
| --- | --- |
| see | Ns |
| see | inf |
| seeing | ing |
| seen | en |
| sees | 3ps |
| sees | Np |
| saw | ed |

TABLE 5

Word Wheel for "buy"

| Word Form | Part of Speech |
| --- | --- |
| buy | Ns |
| buy | inf |
| buying | ing |
| buys | 3ps |
| buys | Np |
| bought | ed en |

TABLE 6

Word Wheel for "purchase"

| Word Form | Part of Speech |
| --- | --- |
| purchase | Ns |
| purchase | inf |
| purchased | ed en |
| purchases | Np |
| purchases | 3ps |
| purchasing | ing |

TABLE 7

Word Wheel for "observe"

| Word Form | Part of Speech |
| --- | --- |
| observe | inf |
| observed | ed en |
| observes | 3ps |
| observing | ing |

As illustrated by the word wheels in tables 1–7, certain words such as "hammer" and "see" are found in a single word wheel. Other words, such as "saw" have multiple word wheels that are returned by the morphological word database engine 100.

The parts of speech of the word forms in tables 1–7 are shown by alphabetic codes for expository convenience. For example, the code "Ns" stands for noun singular, while "inf," "ing," "en," "3ps," "Np," "ed" stand for infinitive, gerund, past tense, third person singular, noun plural, and past participle, respectively. The "ed en" code stands for both past tense and past participle usage. In the preferred embodiment, numeric codes are used in the database 102 as part-of-speech identifiers.

The word wheels illustrated in the tables 1–7 further illustrate that some word forms have multiple parts of speech. For example, the part-of-speech identifier "ed en" associated with the word forms "sawed" and "hammered" indicates that these word forms are used as both past tense and past participle parts of speech. Other word forms, such as "sees," also have multiple parts of speech (i.e., third person singular as in "he sees the fish," and noun plural as in "the archbishop presides over several sees"). This is represented in the word wheel shown in table 2 by separate entries in which these word forms are associated with different part-of-speech identifiers (i.e., the codes "3ps" and "Np").

As described previously, the morphological replace tool 66 is activated by the "find next," "replace," and "replace all" buttons 91, 93, and 94 along with the "find all word forms" check box 88, or their equivalents in the macro language. When the user selects the check box 88 and actuates the "find next" button 91, the replace tool 66 searches the text document 54 for a next occurrence of an inflected form of the find word specified in the "find what" text entry box 81.

To find the next inflected form of the specified find word, the morphological replace tool 66 initiates a search by the morphological word database engine 100 for any word wheels that contain the specified find word. If no word wheel containing the specified find word is found by the morphological word database engine 100, the find word specified by the user is either incomplete, or an uncommon word. (Illegal text entries are disallowed and an error dialog generated in the preferred embodiment.) As a result of not finding any word wheels that contain the specified find word, the morphological replace tool 66 will be unable to find other inflected forms of the specified find word's root word. Accordingly, the replace tool 62 continues the find action by searching the text document word-for-word for a next occurrence that literally matches (other than differences in capitalization) the specified find word, rather than morphologically matching any of the specified find word's word forms.

If one or more word wheels contain the specified find word, the morphological word database engine 100 returns the word forms in such word wheels (the "find word wheels") to the morphological replace tool 66. If more than one word wheel contains the specified find word, the morphological word database engine 100 selects a single one of the find word wheels in the same manner described below as when the "replace" button 93 is activated. The morphological replace tool 66 then searches the text document 54 word by word. Each word in the text document 54 is compared to every word form in the single selected find word wheel. The morphological replace tool 66 finds an occurrence of an inflected form of the find word when a compared word from the text document 54 matches any of the word forms in the single selected find word wheel.

For example, the following table 8 illustrates a sample text for the text document 54. When the user specifies "buy" as the find word and activates the find next button 91 with the "find all word forms" check box 88 selected, the morphological replace tool 66 utilizes the "buy" word wheel shown in table 5 above, and finds the word "buy" in line 4 of the text. Additional activations of the find next button 91 cause the morphological replace tool 66 to find "buys," then "bought."

TABLE 8

| | Sample Text Document. |
| --- | --- |
| 1 | I sawed the wood. |
| 2 | I have seen the light. |
| 3 | |
| 4 | Buy, buys, bought. Go, goes, gone. |

When the user activates the replace button 93 with the find all word forms check box 88 selected, the morphological replace tool 66 finds and replaces a next occurrence of an inflected form of the specified find word in the text document 54 with an inflected form of the specified replacement word having a same part of speech. The morphological replace tool 66 begins by querying the morphological word database engine 100 for any word wheels containing the find word (the "find word wheels"), and any word wheels containing the replacement word (the "replacement word wheels"). For each of the find and replacement words, this query has three possible results: (1) the word is not in the database ("word unknown"), (2) a single word wheel contains the word, or (3) the word is contained in multiple word wheels.

In cases where the find word is unknown (not in the word forms database 102), the morphological replace tool 66 is unable to find inflected forms of the specified find word (regardless of whether any word wheels contain the replacement word). Accordingly, the editing tool 62 will not search for or find other inflected forms of the specified find word's root word. The editing tool 62 proceeds with the replace action by searching the text document word-by-word for a literal match (excepting capitalization differences) to the specified find word. If found, the editing tool 62 replaces that occurrence with the replacement word exactly as specified by the user in the replace with text entry box 82 (and retaining the found occurrence's capitalization).

In cases where the morphological word database engine 100 returns one or more find word wheels, but the replacement word is unknown, the morphological replace tool 66 is unable to replace occurrences of the find word's inflected forms with inflected forms of the replacement word. Accordingly, the morphological replace tool 66 finds inflected forms of the find word and replaces them literally with the specified replacement word (while retaining the capitalization of the found occurrence). The morphological replace tool 66 first searches the text document 54 for the next occurrence of any word form from the find word wheels. If there are multiple find word wheels, the morphological replace tool 66 finds occurrences of word forms from any of the multiple find word wheels. (Although multiple find word wheels is an ambiguous case, the intended root word cannot be determined from the specified find and replace words alone. The user therefore is assumed to have intended to find forms of both root words when selecting the find all word forms check box 88.) If found, the morphological replace tool 66 literally replaces the occurrence with the replacement word (again retaining the found occurrence's capitalization).

For example, if the find word is "buy" and the replacement word is "asdf," the morphological word database engine 100 returns the single find word wheel shown in table 5 above and fails to find the replacement word in the morphological word database 102. In successive activations of the replace button 91, the morphological replace tool 66 then finds "buy," "buys," and "bought" in line 4 of the sample text of table 8. The morphological replace tool 66 replaces each of these forms of "buy" with "asdf."

As a further example, if the find word is "saw" and the replacement word is "asdf," the engine 100 returns multiple find word wheels shown in tables 3 and 4 above and again fails to find the replacement word in the database 102. In successive activations of the replace button 91, the morphological replace tool 66 finds "sawed" in line 1 and "seen" in line 2 of the sample text of table 8. The morphological replace tool 66 replaces each of these forms of "saw" with "asdf."

In a case where both the find and replacement words are in the database 102, morphological replacement of the find word's inflected forms with the replacement word's forms can be accomplished. However, an ambiguity results if either or both of the find and replacement words are contained in multiple word wheels. (When the find word or replacement word is contained in multiple word wheels, the respective find or replacement word is an inflected form of multiple root words. The user, however, generally intends to find or replace inflected forms of only one of these root words with the morphological replace tool 66.) In accordance with the invention, the morphological replace tool 66 resolves this ambiguity by selecting only a single find word wheel when multiple find word wheels are returned by the morphological word database engine 100, and only a single replacement word wheel when the engine 100 returns multiple replacement word wheels. The morphological replace tool 66 then utilizes the single find word wheel and the single replacement word wheel to morphologically replace the find word's inflected forms with those of the replacement word.

In the preferred embodiment, the single find word wheel and the single replacement word wheel are selected from multiple word wheels by comparing the wheels' parts of speech for the find word and the replacement word. The word wheels having the best matching parts of speech for the find word and the replacement word are selected as the single find and replacement word wheels. When specifying the find and replacement words, the user is assumed to specify inflected forms with the same parts of speech of the root words that are intended to be morphologically found and replaced. Accordingly, by selecting the single find and replacement word wheels having best matching part-of-speech identifiers for the find and replacement words, the morphological replace tool 66 selects word wheels of the root words most likely intended by the user to be morphologically found and replaced.

More specifically, in a case where there are multiple find word wheels and a single replacement word wheel, the morphological replace tool 66 checks the part-of-speech identifier associated with the find word in each of the find word wheels and compares them against the part-of-speech identifier associated with the replacement word in the replacement word wheel. The word wheel which contains the find word with associated part-of-speech identifier(s) that best match the part-of-speech identifiers in the replacement word wheel for the replacement word is selected as the single find word wheel. For example, if "saw" is the find word and "hammer" is the replacement word, the morphological word database engine 100 returns the two "saw" word wheels shown in tables 3 and 4 above as the find word wheels, and the "hammer" word wheel shown in table 1 as the replacement word wheel. In the "hammer" word wheel (table 1), the noun singular ("Ns") and infinitive ("inf") part-of-speech identifiers are associated with the replacement word, "hammer." Similarly, in the noun form "saw" word wheel (table 3), the noun singular ("Ns") and infinitive ("inf") part-of-speech identifiers are associated with the find word, "saw." However, in the verb form "saw" word wheel (table 4), the past tense verb ("ed") part-of-speech identifier is associated with the find word, "saw." Accordingly, when the morphological replace tool 66 compares the part-of-speech identifiers for "saw" in the "saw" word wheels (tables 3 and 4) to the part-of-speech identifiers for "hammer" in the "hammer" word wheel (table 1), the noun form "saw" word wheel is found to contain part-of-speech identifiers for "saw" that best match those for "hammer" in the "hammer" word wheel. The morphological replace tool 66 therefore selects the noun form "saw" word wheel (table 3) as the single find word wheel. This reflects the user's probable intent when specifying "saw" and "hammer" as the find and replacement words, respectively.

In a case where the morphological word database engine 100 returns a single find word wheel and multiple replacement word wheels, the morphological replace tool 66 likewise compares the part-of-speech identifiers associated with the replacement word in the replacement word wheels to those of the find word in the find word wheels. Based on the available replacement word wheels, the morphological replace tool 66 selects the single word wheel with part-of-speech identifiers for the replacement word that best match part-of-speech identifiers for the find word in the find word wheel. For example, if "hammer" is the find word and "saw" is the replacement word, then the "hammer" word wheel (table 1) is the find word wheel and the "saw" word wheels (tables 3 and 4) are the replacement word wheels. The morphological replace tool 66 selects the "saw" noun form word wheel (table 3) because it associates part-of-speech identifiers (i.e., "Ns" and "inf") with "saw" that best match the part-of-speech identifiers (i.e., "Ns" and "inf") for "hammer" in the "hammer" word wheel.

In a case where multiple find word wheels and multiple replacement word wheels are returned by the engine 100, the morphological replace tool 66 again compares part-of-speech identifiers for the find and replacement words in their respective multiple word wheels. Then, based on this comparison, the morphological replace tool 66 selects the single find word wheel and single replacement word wheel with the best matching part-of-speech identifiers for the find and replacement words, respectively.

In the unlikely event of a tie between more than one of multiple find word wheels or between more than one of multiple replacement word wheels (i.e., due to no matching part-of-speech identifiers among the multiple word wheels, or part-of-speech identifiers that match equally well in more than one of the multiple word wheels) in any of the above multiple find or replacement word wheel cases, the morphological replace tool 66 selects the longest of the multiple word wheels (i.e., the word wheel containing the most word forms) as the single find or replacement word wheel. This selection is based on the assumption that the user is more likely to select morphological find and replace in a situation where the find and replacement words have many inflected forms since the number of manual find and replace actions potentially avoided in a morphological find and replace operation increases with the number of inflected forms.

In a case where only one find word wheel and one replacement word wheel is returned by the engine 100, the morphological replace tool 66 selects these word wheels as the single find word wheel and the single replacement word wheel to be utilized in morphologically replacing the find word's inflected forms with those of the replacement word. This selection can be made without regard to whether the specified find and replacement words contained in the find word wheel and replacement word wheel have matching part-of-speech identifiers.

After selecting a single find word wheel and a single replacement word wheel in the above cases where one or more find word wheels and one or more replacement word wheels are returned by the database engine 100, the morphological replace tool 66 proceeds to replace an occurrence of a word form from the find word wheel with a corresponding word form from the replacement word wheel. The morphological replace tool 66 begins by searching the text document 54 for a next occurrence of an inflected form of the find word (hereafter the "found occurrence"). The morphological replace tool 66 compares the text document 54 word by word against the word forms in the find word wheel. The morphological replace tool 66 searches in a direction from a current insertion point of the text document 54 as specified by the user with the drop down list control 83. (If a portion of the text is currently selected ("selected text block"), the search is limited to the selected text block.) Those compared words from the text document 54 that match any of the word forms in the find wheel are found occurrences of the find word's inflected forms. The morphological replace tool 66 continues the search until a next occurrence is found or all words within the scope of the search have been compared to the find word wheel's word forms. A status message indicating failure is displayed if no occurrences are found in the text document 54 within the scope of the search.

When a next occurrence of any of the find word wheel's word forms is found in the text document 54 within the scope of search, the morphological replace tool 66 replaces that next occurrence with a word form from the replacement wheel having a matching part-of-speech identifier (as shown in the table 9 described below). For example, where "buy" is the find word and "purchase" is the replacement word for a morphological replace next of the sample text (table 8), the morphological replace tool 66 searches the sample text for a word that matches any word forms in the "buy" word wheel (table 5). The morphological replace tool 66 first finds the word "buy" in line 4 of the sample text. In the "buy" word wheel (table 5), the word form "buy" is associated with "Ns" and "inf" part-of-speech identifiers. The morphological replace tool 66 then checks the part-of-speech identifiers associated with word forms in the "purchase" word wheel (table 6). In the "purchase" word wheel, the Ns and inf part-of-speech identifiers are both associated with the word form "purchase." Since "purchase" is associated with part-of-speech identifiers that match those for the found word "buy," the morphological replace tool 66 replaces the word "buy" on line 4 of the sample text with "purchase." In a like manner, the morphological replace tool 66 finds the words "buys" (with 3ps and Np part-of-speech identifiers) and "bought" (with ed en part-of-speech identifier) on line 4 in subsequent activations of the replace next button 93, and replaces them with the word forms "purchases" (with 3ps and Np part-of-speech identifiers) and "purchased" (with ed en part-of-speech identifier), respectively.

As another example, after selecting the noun form "saw" word wheel (table 3) and the "hammer" word wheel (table 1) where "saw" and "hammer" are the find and replacement words, respectively, the morphological replace tool 66 searches the sample text for occurrences of word forms from the "saw" word wheel. The morphological replace tool 66 finds the word "sawed" on line 1 since it matches a word form in the noun form "saw" word wheel. The morphological replace tool 66 then replaces "sawed" on line 1 with the word form "hammered" from the "hammer" word wheel, since "sawed" and "hammered" have matching part-of-speech identifiers (both are associated with the "ed en" part-of-speech identifier). If the replace button 93 is again activated, the morphological replace tool 66 finds no other occurrences of the noun form "saw" word wheel's word forms in the sample text. Since only the noun form "saw" word wheel is selected as the single find word wheel, the word "seen" on line 2 of the text document 54 which is in the verb form "saw" word wheel (table 4) consequently is not found by the morphological replace tool 66 nor replaced by the word form "hammered" with a matching part-of-speech identifier from the replacement word wheel. This is the result most likely intended by the user.

When the replacement word wheel does not contain any word form whose part-of-speech identifier matches the part-of-speech identifier of the found occurrence, the morphological replace tool 66 replaces the found occurrence literally with the specified replacement word (while retaining the capitalization of the found occurrence).

When determining which word form chosen from the selected replacement word wheel is to replace a found occurrence of a word form from the selected find word wheel in the text document 54, an ambiguity results if more than one word form in the selected replacement word wheel matches a part of speech of the found occurrence. For example, if the find word is "observe" and the replacement word is "see," then the morphological replace tool 66 selects the "observe" word wheel (table 7) and the "see" word wheel (table 2) as the single find and single replacement word wheels, respectively. If the morphological replace tool 66 then finds the word "observed" (associated with the "ed en" part-of-speech identifier) when searching in the text document 54 for word forms from the "observe" word wheel, the tool will look for word forms with matching parts of speech in the "see" word wheel to replace the found occurrence, "observed." In the "see" word wheel, however, two words forms, "seen" and "saw" have matching part-of-speech identifiers, "ed" and "en," respectively. The morphological replace tool 66 resolves the ambiguity by selecting the word form in the replacement word wheel whose part-of-speech best matches that of the found occurrence as the word form for replacing the found occurrence. The user can confirm the selected word form, or override the selection by entering another word form to replace the found occurrence.

In the preferred embodiment, the morphological replace tool 66 determines the best matching part of speech by scoring each of the matching part of speech word forms in the replacement word wheel according to a predetermined ranking of their parts of speech against the found occurrence's part of speech. The highest scoring word form is selected as having the best matching part of speech. More specifically, for each part-of-speech identifier or identifiers that may be associated with found occurrences, any matching part-of-speech identifiers are given a predetermined ranking. For example, a found occurrence (such as "observed" in the immediately preceding example) may be associated with the "ed en" identifier for the past tense verb and past participle parts of speech. This identifier can be matched by any of three part-of-speech identifiers, i.e., the "ed en," "ed," and "en" part-of-speech identifiers. These three part-of-speech identifiers are given a predetermined ranking to be used in scoring word forms associated with these part-of-speech identifiers in the replacement wheel.

The following table 9 lists various part-of-speech identifiers and the predetermined rankings of their matching part-of-speech identifiers that are utilized in the preferred embodiment. The part-of-speech identifiers and rankings can be modified in alternative embodiments of the invention to yield different morphological find and replace behavior as desired. The matching part-of-speech identifier rankings are implemented in the preferred embodiment as a hard-coded table. In alternative embodiments, the predetermined rankings can be implemented as a stored text string, sequence of processing steps, or other implementation that imposes for each part-of-speech identifier an ordering of a set of matching part-of-speech identifiers.

In the preferred embodiment, two part-of-speech identifiers are considered to match if the parts of speech that they represent match in the morphological sense. Accordingly, the part-of-speech identifiers "Ed" and "EdEn" are matching since both encompass a same morphological form (i.e., past tense verb), although they are not identical identifiers.

TABLE 9

Predetermined Rankings of Matching Part-Of-Speech Identifiers

| Part of Speech | Part-of-speech Id | Ranking (in best to worst order) of matching part-of-speech identifiers |
| --- | --- | --- |
| Singular noun | Ns | Ns, NsNp |
| Unmarked adjective | JJ | JJ |
| Unmarked adverb | RB | RB |
| Plural noun | Np | BNP, Np, NsNp |
| Infinitive verb | Inf | Inf, Inf Ed, InfEn, InfEdEn, Inf3ps |
| Past tense verb and past participle | EdEn | BEdEn, EdEn, Ed, En, InfEdEn, IngEdEn, InfEd, InfEn, 3psEd |
| gerund, present participle | Ing | BIng, Ing, IngEdEn |
| third person singular present tense verb | 3ps | 3ps, 3psEd, Inf3ps |
| Comparative adjective | JJER | JJER |
| Superlative adjective | JJEST | JJEST |
| Singular and plural noun | NsNp | NsNp, Ns, BNp, Np |
| Comparative adverb | RBER | RBER |
| Superlative adverb | RBEST | RBEST |
| Past participle | En | En, BEdEn, EdEn, InfEn, InfEdEn, IngEdEn |
| Past tense verb | Ed | Ed, BEdEn, EdEn, InfEd, InfEdEn, IngEdEn, 3psEd |
| Infinitive and past tense verb | InfEd | InfEd, InfEdEn, Ed, BEdEn, EdEn, IngEdEn, 3psEd, Inf, InfEn, Inf3ps |
| Infinitive and past participle | InfEn | InfEn, InfEdEn, En, BEdEn, EdEn, Inf, InfEd, IngEdEn, Inf3ps, |
| Infinitive, past tense verb and past participle | InfEdEn | InfEdEn, BEdEn, EdEn, IngEdEn, InfEd, InfEn, Ed, En, Inf, 3psEd, Inf3ps |
| Nominative pronoun | Nom | Nom, NomObj |
| Objective pronoun | Obj | Obj, NomObj |
| Possessive pronoun | Poss1 | Poss1, Poss1Poss2, Poss2Poss1, ObjPoss1 |
| Independent possessive pronoun | Poss2 | Poss2, Poss1Poss2, Poss2Poss1 |
| Reflexive pronoun | Refl | Refl |
| Possessive and independent possessive pronoun | Poss1Poss2 | Poss1Poss2, Poss2Poss1, Poss1, Poss2, ObjPoss1 |
| Nominative and objective pronoun | NomObj | NomObj, Nom, Obj |
| Third person singular and past tense verb | 3psEd | 3psEd, 3ps, Ed, Inf3ps, BEdEn, EdEn, InfEd, InfEdEn, IngEdEn, 3psEd |
| Infinitive and third person singular present tense verb | Inf3ps | Inf3ps, Inf, 3ps, 3psEd, InfEd, InfEn, InfEdEn |
| British past tense verb and past participle | BEdEn | BEdEn, EdEn, Ed, En, InfEdEn, InfEd, InfEn, |

TABLE 9-continued

Predetermined Rankings of Matching
Part-Of-Speech Identifiers

| Part of Speech | Part-of-speech Id | Ranking (in best to worst order) of matching part-of-speech identifiers |
|---|---|---|
| British gerund, present participle | BIng | 3psEd<br>BIng, Ing |
| Negative third person singular present tense verb | N3ps | N3ps, N3psNed |
| Negative infinitive verb | NInf | NInf |
| Negative past tense verb | Ned | Ned, N3psNed |
| Objective and possessive pronoun | ObjPoss1 | ObjPoss1, Obj, Poss1, NomObj, Poss1Poss2, Poss2Poss1 |
| Possessive and independent possessive pronoun | Poss2Poss1 | Poss2Poss1, Poss1Poss2, Poss1, Poss2, ObjPoss1 |
| British plural noun | BNp | BNp, Np, NsNp |
| gerund, present participle, past tense verb, past participle | IngEdEn | IngEdEn, Ing, BEdEn, EdEn, Ed, En, InfEdEn, InfEd, InfEn, 3psEd |
| Negative third person singular present tense verb, negative past tense verb | N3psNed | N3psNed, N3ps, NEd |

As discussed previously, the word forms database 102 used in the preferred embodiment for the English language includes both British (i.e., U.K., Canada, Australian, and similar usage as previously mentioned) and U.S. word forms. To distinguish the British variants from the U.S. variants of the word forms, the part-of-speech identifiers "BEdEn," "BIng," and "BNp," are associated with the British word forms in the database.

When the morphological replace tool 66 is replacing a found occurrence that is a British variant of the specified find word, a British variant word form from the replacement word wheel is considered a better match than the U.S. equivalent, and will be used to English version word processor under the assumption that a U.S. user working on a document that includes British variants will want to continue using British variant word forms in the document.

Conversely, when the found occurrence is not a British variant word form, a matching British variant word form from the replacement word wheel is only preferred over a U.S. variant word form for the British version word processor. The U.S. version word processor treats the matching U.S. variant word form in replacement wheel as the better match, making an exception from the predetermined part-of-speech rankings listed in the above table 9 in such cases. Accordingly, the U.S. version word processor only replaces with a British variant word form when the found occurrence is a British variant. For example, with "move" as the find word and "travel" as the replacement word, the British version word processor replaces a found occurrence of "moving" with the British variant "travelling," while the U.S. version word processor replaces the found occurrence with the U.S. variant "traveling."

In alternative embodiments of the invention for use with languages other than English, word forms of multiple related dialects likewise can be handled by assigning part-of-speech identifiers to represent the word forms variants of one or more particular dialects, and appropriately ordering the dialects' part-of-speech identifiers in the matching part-of-speech identifier rankings to result in replacement of word form variants of the find word in a particular dialect with a matching word form variant of the replacement word in the same dialect where available.

In some cases, the morphological replace tool 66 may find words in the text document 54 that match multiple word forms in the find word wheel. For example, the word "sees" appears in the "see" word wheel (table 2) associated in one entry with the noun plural part-of-speech identifier and in another entry with the third person singular verb part-of-speech identifier. When no word form in the replacement word wheel has a part-of-speech identifier matching that of the word form first matched to the found occurrence, the morphological replace tool 66 checks the find word wheel for another word form that matches the found occurrence. If the find word wheel contains another word form matching the found occurrence, the morphological replace tool 66 again looks for word forms in the replacement word wheel with matching part-of-speech identifiers. With "see" and "observe" as find and replacement words for example, if the word "sees" in the text document 54 is first matched to the entry in the find word wheel (the "see word wheel of table 2) in which "sees" is associated with the noun plural part-of-speech identifier, no word forms with matching part-of-speech identifiers are found in the replacement word wheel (the "observe" word wheel of table 7). The morphological replace tool 66 therefore checks the "see" word wheel for another word form that matches the found occurrence and locates the entry for "sees" which is associated with the third person singular verb part-of-speech identifier. Since the replacement word wheel contains the word form "observes" with a matching part-of-speech identifier, the morphological replace tool 66 replaces the found occurrence of "sees" in the text document with "observes."

If no word forms with matching part-of-speech identifiers are found in the replacement word wheel after each word form that matches the found occurrence is checked, the morphological replace tool 66 replaces the found occurrence with the replacement word as specified in the replace with text entry box 82 (FIG. 3).

Referring again to FIG. 3, when the user activates the replace button 93, the morphological replace tool 66 replaces only the next occurrence of the selected find word wheel's inflected forms with the word form from the replacement word wheel having the best matching part of speech (except when the user overrides the best matching replacement word form by entering a different replacement character string). After replacing the next occurrence, the morphological replace tool 66 stops pending further user input.

By contrast, when the user activates the replace all button 94, the morphological replace tool 66 replaces all occurrences of the selected find word wheel's word forms in the scope of search with those of the replacement word wheel without pausing for user confirmation. Although the same steps as in the morphological replace action are utilized to resolve ambiguities in the morphological replace all action, the user may not anticipate some or all of the replacements.

Since the morphological replace all action replaces words in disperse locations through the text document, the morphological replace all action can have very destructive consequences.

Figure 4:
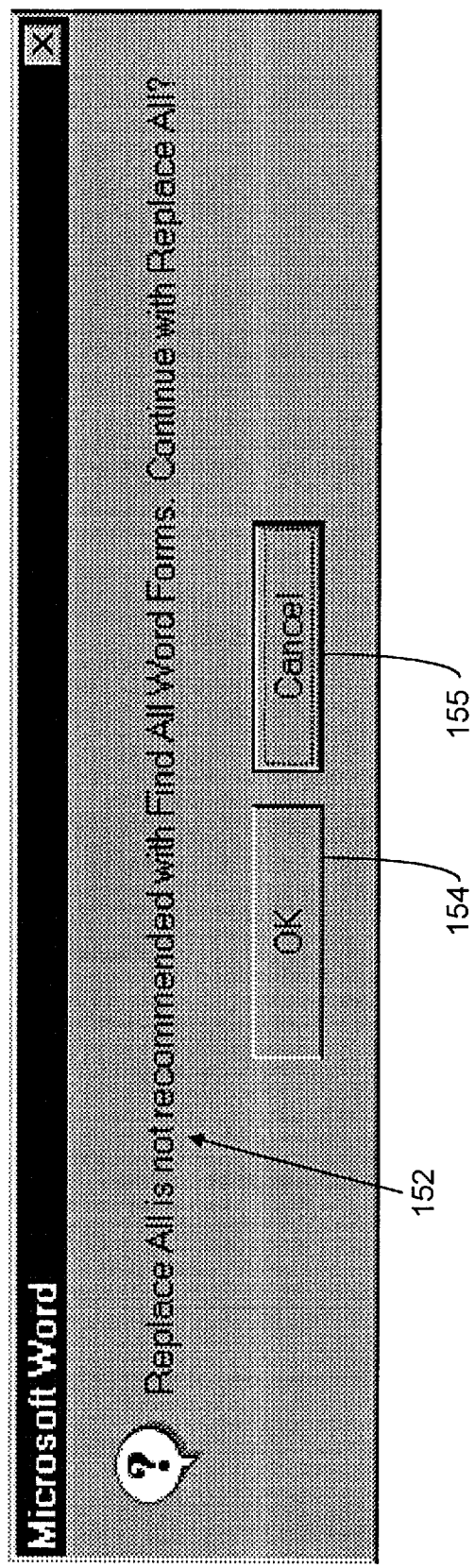
FIG. 4 is a view of a dialog box in the user interface of the word processor of FIG. 2, with controls for a replace all feature of the morphological find and replace editing tool.

With reference to FIG. 4, to further protect the user against unintended destructive consequences of the morphological replace all action, the user interface 56 (FIG. 2) of the word processor 50 (FIG. 2) displays a confirmation dialog box 150 when the replace all button 94 (FIG. 3) is activated with the find all word forms check box 88 (FIG. 3) selected. The confirmation dialog box 150 includes a text message 152 recommending against the morphological replace all action as follows, "Replace All is not recommended with Find All Word Forms. Continue with Replace All?" The confirmation dialog box further comprises buttons 154–155, labeled "OK," and "Cancel," respectively. When the OK button 154 is activated by the user, the morphological replace tool 66 proceeds with the morphological replace all action without further confirmation from the user. Activating the cancel button 155 discontinues the morphological replace all action.

Having described and illustrated the principles of our invention with reference to a preferred embodiment, it will be recognized that the preferred embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the preferred embodiment shown in software may be implemented in hardware and vice versa.

Further, although illustrated by reference to a preferred embodiment which utilizes an English language database, the invention also has application to morphological search and replace editing for other languages.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. In a word processor for a computer system, a method of finding and replacing forms of a find word with forms of a replace word in a text document, the method comprising:

storing a plurality of word form sets in a word forms database, each word form set comprising a plurality of word forms having a same word base, each word form being associated with at least one part-of-speech identifier;

searching the word forms database for any word form sets that contain a word form matching the find word, and for any word form sets that contain a word form matching the replace word;

in a case where multiple word form sets each contain a word form matching the find word, selecting a single find word form set out of the multiple word form sets that contain a word form matching the find word;

in a case where multiple word form sets each contain a word form matching the replace word, selecting a single replace word form set out of the multiple word form sets that contain a word form matching the replace word;

searching the text document for a target word that matches any word form in the find word form set, the matched word form in the find word form set being a found word form;

searching the replace word form set for a replacement word form whose associated part-of-speech identifier matches a part-of-speech identifier associated with the found word form; and replacing the target word with the replacement word form.

2. The method of claim 1 wherein the step of selecting the find word form set in the case where multiple word form sets each contain a word form matching the find word, comprises:

searching the word forms database for any word forms that match the find word;

searching the word forms database for any word forms that match the replace word;

selecting out of the word forms that match the find word, a single find word form whose associated part-of-speech identifier best matches a part-of-speech identifier associated with the word forms that match the replace word; and selecting a word form set that contains the single selected find word form as the find word form set.

3. A computer-readable medium having computer-executable instructions for performing the steps recited in claim 2.

4. The method of claim 2 wherein the step of selecting the single find word form comprises:

selecting as the single find word form, a word form whose associated part-of speech identifier best matches a part-of-speech identifier associated with one of the word forms that match the replace word according to a predetermined ranking.

5. The method of claim 2 wherein the step of selecting the replace word form set in the case where multiple word form sets each contain a word form matching the replace word, comprises:

selecting out of the word forms that match the replace word, a single replace word form whose associated part-of-speech identifier best matches a part-of-speech identifier associated with the word forms that match the find word; and selecting a word form set that contains the single selected replace word form as the replace word form set.

6. The method of claim 1 wherein the step of selecting the replace word form set in the case where multiple word form sets each contain a word form matching the replace word, comprises:

searching the word forms database for any word forms that match the find word;

searching the word forms database for any word forms that match the replace word;

selecting out of the word forms that match the replace word, a single replace word form whose associated part-of-speech identifier best matches a part-of-speech identifier associated with the word forms that match the find word; and selecting a word form set that contains the single selected replace word form as the replace word form set.

7. The method of claim 6 wherein the step of selecting the single replace word form comprises:

selecting as the single replace word form, a word form whose associated part-of-speech identifier exactly matches a part-of-speech identifier associated with one of the word forms that match the find word.

8. The method of claim 6 wherein the step of selecting the single replace word form comprises:

selecting as the single replace word form, a word form whose associated part-of speech identifier best matches a part-of-speech identifier associated with one of the word forms that match the find word according to a predetermined ranking.

9. The method of claim 6 wherein the step of selecting the find word form set in the case where multiple word form sets each contain a word form matching the find word, comprises:

selecting out of the word forms that match the find word, a single find word form whose associated part-of-speech identifier best matches a part-of-speech identifier associated with the word forms that match the replace word; and selecting a word form set that contains the single selected find word form as the find word form set.

10. The method of claim 1 comprising:

in a case where part-of-speech identifiers of multiple word forms in the replace word form set match part-of-speech identifiers associated with the found word form, selecting a single replacement word form whose part-of-speech identifier best matches the part-of-speech identifiers associated with the found word form.

11. The method of claim 10 wherein the step of selecting the single replacement word form comprises:

selecting a word form in the replace word form set whose part-of-speech identifiers exactly match the part-of-speech identifiers of the found word as the single replacement word form.

12. The method of claim 10 wherein the step of selecting the single replacement word form comprises:

scoring each of the word forms in the replace word form whose part-of-speech identifier matches at least one of the part-of-speech identifiers associated with the found word form according to a predetermined ranking of any part-of-speech identifiers that match the part-of-speech identifiers associated with the found word form; and selecting a highest scoring word form as the single replacement word form.

13. The method of claim 1 comprising:

in a case where first and second word forms in the find word form set match the target word, searching the replace word form set for a replacement word form whose part-of-speech identifier matches a part-of-speech identifier associated with the first word form; and if no word form in the replace word form set has an associated part-of-speech that matches a part-of-speech identifier associated with the first word form, searching the replace word form set for a replacement word form whose part-of-speech identifier matches a part-of-speech identifier associated with the second word form.

14. A computer-readable medium having computer-executable instructions for performing the steps recited in claim 6.

15. A computer-readable medium having computer-executable instructions for performing the steps recited in claim 1.

16. In a word processor for a computer system, a method of finding and replacing forms of a find word with forms of a replace word in a text document, the method comprising:

storing a plurality of word form sets in a word forms database, each word form set comprising a plurality of word forms having a same word base, each word form being associated with at least one part-of-speech identifier;

searching the word forms database for a find word form set that contains a word form matching the find word, and for a replace word form set that contains a word form matching the replace word;

searching the text document for a target word that matches any word form in the find word form set, the matched word form in the find word form set being a found word form;

searching the replace word form set for a replacement word form whose associated part-of-speech identifier matches a part-of-speech identifier associated with the found word form;

in a case where part-of-speech identifiers of multiple word forms in the replace word form set match part-of-speech identifiers associated with the found word form, selecting a single replacement word form whose part-of-speech identifier best matches the part-of-speech identifiers associated with the found word form; and replacing the target word with the replacement word form.

17. The method of claim 16 wherein the step of selecting the single replacement word form comprises:

selecting a word form in the replace word form set whose part-of-speech identifiers exactly match the part-of-speech identifiers of the found word as the single replacement word form.

18. The method of claim 16 wherein the step of selecting the single replacement word form comprises:

scoring each of the word forms in the replace word form whose part-of-speech identifier matches at least one of the part-of-speech identifiers associated with the found word form according to a predetermined ranking of any part-of-speech identifiers that match the part-of-speech identifiers associated with the found word form; and selecting a highest scoring word form as the single replacement word form.

19. A computer-readable medium having computer-executable instructions for performing the steps recited in claim 16.

20. In a word processor for a computer system, a method of finding and replacing forms of a find word with forms of a replace word in a text document, the method comprising:

storing a plurality of word form sets in a word forms database, each word form set comprising a plurality of word forms having a same word base, each word form being associated with at least one part-of-speech identifier;

searching the word forms database for a find word form set that contains a word form matching the find word, and for a replace word form set that contains a word form matching the replace word;

searching the text document for a target word that matches any word form in the find word form set, the matched word form in the find word form set being a found word form;

in a case where first and second word forms in the find word form set match the target word, searching the replace word form set for a replacement word form whose part-of-speech identifier matches a part-of-speech identifier associated with the first word form; and if no word form in the replace word form set has an associated part-of-speech that matches a part-of-speech identifier associated with the first word form, searching the replace word form set for a replacement word form whose part-of-speech identifier matches a part-of-speech identifier associated with the second word form; and replacing the target word with the replacement word form.

21. A computer-readable medium having computer-executable instructions for performing the steps recited in claim 20.

22. A word processor in a computer system, comprising:

a first user interface control operable by a user to select morphological find and replace editing of forms of a find word with forms of a replace word within a text document;

a word forms database for storing a plurality of word form sets, each word form set comprising a plurality of word forms having a same word base, each word form being associated with at least one part-of-speech identifier;

a morphological word database engine for searching the word forms database for find word form sets that contain word forms matching the find word, and for replace word form sets that contain word forms matching the replace word;

a morphological find and replace editing service operative responsive to the first user interface control:
(a) to cause the morphological word database engine to search for the find word form sets and the replace word form sets;
(b) to select only a single find word form set and only a single replace word form set that contain word forms matching the find word and the replace word, respectively;
(c) to search the text document for a target word matching any word form of the selected single find word form set, the matched word form of the selected single find word form set being a found word form;
(d) to select a replacement word form from the selected single replace word form set whose associated part-of-speech identifier matches a part-of-speech identifier of the found word form; and
(e) to replace the target word with the replacement word form.

23. The word processor of claim 22 comprising:

a second user interface control operable by the user to select morphological find and replace editing of all target words matching forms of the find word with forms of the replace word within at least a portion of the text document;

a user interface dialog displayed responsive to the second user interface control and comprising a recommendation against selecting morphological find and replace editing of all target words; and a third user interface control associated with the user interface dialog operable by the user to confirm selection of morphological find and replace editing of all target words.

24. The word processor of claim 22 wherein the morphological find and replace editing service selects the single find word form set that contains a word form matching the find word whose associated part-of-speech identifier best matches an associated part-of-speech identifier of a word form matching the replace word in the replace word form sets.

25. The word processor of claim 22 wherein the morphological find and replace editing service selects the single replace word form set that contains a word form matching the replace word whose associated part-of-speech identifier best matches an associated part-of-speech identifier of a word form matching the find word in the find word form sets.

26. The word processor of claim 22 wherein the morphological find and replace editing service selects the found word form out of the single find word form set whose part-of-speech identifier matches a part-of-speech identifier of any word form in the single replace word form set.

27. The word processor of claim 22 wherein the morphological find and replace editing service selects the replacement word form out of the word forms in the single replace word form set whose part-of-speech identifier best matches the found word form's part-of-speech identifier.

28. The word processor of claim 27 wherein at least one of the word form sets in the word forms database comprises a word form variant of a dialect associated with a part-of-speech identifier indicative of the dialect, and wherein the morphological find and replace editing service selects the replacement word form associated with a part-of-speech identifier indicative of the dialect out of a plurality of replace word forms associated with part-of-speech identifiers that match the found word form's part-of-speech identifier as the replacement word form whose part-of-speech identifier best matches the found word form's part-of-speech identifier.

29. The word processor of claim 27 wherein the morphological find and replace editing service scores each word form in the single replace word form set whose part-of-speech identifier matches the found word form's part-of-speech identifier according to a predetermined ranking of part-of-speech identifiers that match the found word form's part-of-speech identifier, and selects the highest scoring part-of-speech identifier as the best-matching part-of-speech identifier.

30. In a word processor for a computer system, a method of finding and replacing forms of a find word with forms of a replace word in a text document, the method comprising:

storing a plurality of word form sets in a word forms database, each word form set comprising a plurality of word forms having a same word base, each word form being associated with at least one part-of-speech identifier;

searching the word forms database for any word form sets that contain a word form matching the find word, and for any word form sets that contain a word form matching the replace word;

in a case where multiple word form sets each contain a word form matching the find word, selecting only a single find word form set out of the multiple word form sets that contain a word form matching the find word;

searching the text document for a target word that matches any word form in the find word form set, the matched word form in the find word form set being a found word form;

searching the replace word form set for a replacement word form whose associated part-of-speech identifier matches a part-of-speech identifier associated with the found word form; and replacing the target word with the replacement word form;

wherein the step of selecting the find word form set in the case where multiple word form sets each contain a word form matching the find word, comprises:

searching the word forms database for any word forms that match the find word;

searching the word forms database for any word forms that match the replace word;

selecting out of the word forms that match the find word, a single word form whose associated part-of-speech identifier exactly matches a part-of-speech identifier associated with one of the word forms that match the replace word; and selecting a word form set that contains the single selected find word form as the find word form set.

\* \* \* \* \*